2,871,202
ORGANO-PHOSPHORUS POLYMERS

Carleton B. Scott, Pomona, Calif., assignor to Union Oil Company of California, Los Angeles, Calif., a corporation of California No Drawing. Application June 27, 1955
Serial No. 518,390

8 Claims. (Cl. 260—2)

This invention relates to new polymeric materials, and in particular concerns high-molecular weight polymers or condensation products containing phosphorus in combination with carbon, hydrogen, and oxygen, sulfur, or nitrogen. These materials vary in physical form from viscous liquids to resinous, crystalline or rubber-like solids depending upon their method of preparation, and are useful in the fabrication of molded or extruded shapes, as extenders and plasticizing agents for synthetic resins and elastomers, and as lubricant additives.

The new materials provided by the invention are prepared by chemical reaction between an alkylene oxide, sulfide or imine and a lower alkyl metaphosphate or thiometaphosphate. The term "lower alkyl" is employed herein to refer to alkyl groups containing from 1 to 4 carbon atoms. The molecular structure of the new products is not known with certainty, although analytical data and infrared spectra suggest the structure:

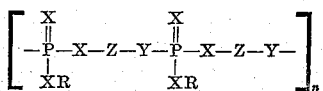

wherein R represents an alkyl group containing from 1 to 4 carbon atoms, X represents oxygen or sulfur, Y represents oxygen, sulfur, or an imine group, Z represents a short-chain alkylene radical derived from the alkylene oxide, sulfide, or imine, and "n" represents an integer corresponding to the degree of polymerization. Such postulated structure, however, has not been established with certainty, and the new products are accordingly described and claimed herein as reaction products rather than as chemical entities whose identity can be only speculative.

The following examples illustrate in a general way the manner in which the present class of new materials is prepared and indicate the form and properties of several of such materials, but are not to be construed as limiting the invention. All amounts are given as parts by weight.

Example I

Approximately 42.6 parts of methyl-trithiometaphosphate were dissolved in about 36 parts of diethyl ether and placed in a reaction vessel equipped with a reflux condenser and an efficient stirring device. Approximately 17.4 parts of 1,2-propylene oxide were added gradually over a period of about 15 minutes, during which time the temperature of the reaction mixture rose from about 23° C. to about 36° C. The ether reaction solvent was then distilled off, leaving the reaction product as an extremely viscous light tan liquid which was soluble in chloroform and similar polar solvents. Chemical analysis showed this material to correspond closely to the empirical formula $C_4H_9POS_3$ and to have a molecular weight of about 1900.

Example II

The procedure of Example I was repeated, substituting a solution of 13.2 parts of ethylene oxide in 18 parts of diethyl ether for the propylene oxide. During addition of the ethylene oxide solution the temperature of the reaction mixture rose to about 36° C. Upon evaporation of the ether there was obtained a fairly stiff light-colored rubber-like solid.

Example III

Example I was repeated, substituting ethylmetaphosphate for the methyl-trithiometaphosphate. As initially obtained, the reaction product was a viscous tan liquid but upon further heating at about 170° C., for about 10 minutes the product changed to a rubber-like mass.

Example IV

Approximately 48 parts of styrene oxide was added gradually to a solution of 43.2 parts of ethyl-metaphosphate in 75 parts of chloroform. During the addition of the styrene oxide the reaction vessel was immersed in an ice bath to prevent the reaction temperature from rising to above about 0° C. The reaction mixture was then allowed to rise to room temperature and the chloroform was evaporated off under reduced pressure. The residue was a clear viscous liquid analyzing 53.3% carbon, 6.3% hydrogen and 10.6% phosphorus.

The alkylene oxides, sulfides, and imines employed in preparing the novel products of the invention may be represented by the generic formula:

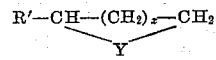

wherein R' represents hydrogen, alkyl or aryl, Y represents oxygen, sulfur or the imine group (—NH—), and x represents an integer less than 2, i. e., 0 or 1. Examples of such compounds include ethylene oxide, propylene oxide, trimethylene oxide, sec.-butyl-ethylene oxide, styrene oxide, ethylene imine, naphthylethylene imine, hexyl-ethylene imine, ethylene sulfide, iso-butyl-ethylene sulfide, p-methylstyrene sulfide, etc. Examples of operable metaphosphate and thiometaphosphate reactants include methyl-metaphosphate, ethyl-metaphosphate, isopropyl-metaphosphate, tert.-butyl-metaphosphate, methyl-trithiometaphosphate, ethyl-trithiometaphosphate, n-propyl-trithiometaphosphate, sec.-butyl-trithiometaphosphate, etc. The alkyl-metaphosphates of this class are formed by reaction between a lower alkyl ether and phosphorus pentoxide, and, as is disclosed in my copending application, Serial No. 508,821, filed May 16, 1955, now U. S. Patent No. 2,764,606, the trithiometaphosphates are obtained by reaction between phosphorus pentasulfide and a lower aliphatic mercaptan. Usually the reactants are employed in approximately equimolecular proportions, although an excess of the oxide, sulfide or imine reactant may be employed to insure complete consumption of the phosphate reactant. Use of the latter in excess is usually not desirable since the unreacted phosphate is difficult to separate from the polymeric reaction product.

The reaction by which the new products are formed takes place very readily upon simple admixture of the two reactants at atmospheric temperatures and in the absence of polymerization or condensation catalysts, and is exothermic to such an extent that when operating with any sizeable quantity of reactants the reaction vessel should be equipped with cooling coils or other means for dissipating the exothermic heat of reaction. The use of an inert reaction solvent, e. g., diethyl ether, chloroform, benzene, toluene, etc., is also of assistance in absorbing and dissipating the heat of reaction, and conducting the reaction in the presence of such a solvent constitutes a preferred mode of operation. The reaction vessel may be fitted with a reflux condenser to prevent loss of the solvent. The reaction is preferably carried out at atmospheric pressure, and the temperature is maintained below the atmospheric boiling point of the lowest boiling component of the reaction mixture, although higher temperatures and superatmospheric pressures may be employed if desired. In the interests of simplifying the problem of heat dissipation, the reaction temperature is usually maintained below about 200° C.

Upon completion of the reaction, the product is purified by evaporating or distilling off the reaction solvent and any unreacted oxide, sulfide or imine reactant. The reaction products themselves are very high-boiling and are distillable only under very high vacuum; accordingly, they are usually employed without further purification. In some cases they may be subjected to extraction with an organic solvent.

As initially obtained, the novel reaction products of the invention are usually obtained as high-boiling viscous liquids, but upon further heating, e. g., at temperatures of 125–200° C. for 2–60 minutes, they further polymerize or condense to form rubber-like or resinous solids. All of such products are insoluble in non-polar solvents but are generally soluble in polar solvents, e. g., chloroform and the like. They are substantially light- and heat-stable, and are compatible with a wide variety of synthetic resins and plastics. The liquid products are particularly useful as plasticizing agents for cellulose derivatives. For example, nitrocellulose films containing 33 percent by weight of the reaction product of ethylmetaphosphate and ethylene oxide cast from acetone-ethanol-butyl acetate solution display unusual flexibility and plasticizer retention.

Other modes of applying the principle of my invention may be employed instead of those explained, change being made as regards the materials or methods employed, provided the products or steps stated by any of the following claims, or the equivalent of such stated products or steps, be obtained or employed.

I, therefore, particularly point out and distinctly claim as my invention:

1. The process which comprises admixing a phosphoric ester selected from the class consisting of alkyl metaphosphates and alkyl trithiometaphosphates in which the alkyl group contains from 1 to 4 carbon atoms with at least about one molecular equivalent of an alkylene compound of the general formula:

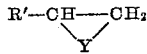

wherein R' represents a substituent selected from the class consisting of hydrogen, alkyl and aryl, and Y represents a substituent selected from the class consisting of oxygen, sulfur and the imine group, while maintaining a reaction temperature below about 200° C.; and thereafter separating from the reaction product so formed any of said alkylene compound remaining unreacted.

2. The process which comprises admixing a phosphoric ester selected from the class consisting of alkyl metaphosphates and alkyl trithiometaphosphates in which the alkyl group contains from 1 to 4 carbon atoms with at least about one molecular equivalent of an alkylene oxide of the general formula:

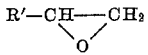

wherein R' represents a substituent selected from the class consisting of hydrogen, alkyl and aryl, while maintaining a reaction temperature below about 200° C.; and thereafter separating from the reaction product so formed any of said alkylene oxide remaining unreacted.

3. A process as defined by claim 1 wherein the said phosphoric ester is an alkyl trithiometaphosphate.

4. A process as defined by claim 2 wherein the said phosphoric ester is an alkyl trithiometaphosphate.

5. A process as defined by claim 2 wherein the said alkylene compound is ethylene oxide.

6. A process as defined by claim 2 wherein the said phopshoric ester is methyl trithiometaphosphate.

7. A process as defined by claim 2 wherein the said phosphoric ester is methyl trithiometaphosphate and the said alkylene compound is ethylene oxide.

8. The process which comprises admixing a phosphoric ester selected from the class consisting of alkyl metaphosphates and alkyl trithiometaphosphates in which the alkyl group contains from 1 to 4 carbon atoms with at least about one molecular equivalent of an alkylene oxide of the general formula:

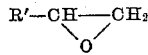

Wherein R' represents a substituent selected from the class consisting of hydrogen, alkyl and aryl, in the presence of an inert reaction solvent while maintaining a reaction temperature below about 200° C.; separating the reaction product so formed from the said reaction solvent and any unreacted alkylene oxide; and thereafter heating the reaction product to a temperature between about 125° C. and about 200° C. until a solid product is formed.

References Cited in the file of this patent

UNITED STATES PATENTS

| | | |
|---|---|---|
| 2,616,873 | Cass | Nov. 4, 1952 |
| 2,636,876 | Zenftman et al. | Apr. 28, 1953 |

OTHER REFERENCES

Kosalapoff "Organo Phosphorus Compounds," John Wiley & Sons Inc., New York, 1950, pages 232 and 347–8 (Copy in Scientific Library.)